US010379560B2

(12) United States Patent
Silva et al.

(10) Patent No.: US 10,379,560 B2
(45) Date of Patent: Aug. 13, 2019

(54) HOME AUTOMATION SYSTEM DEVICE POWER OPTIMIZATION

(71) Applicant: Savant Systems, LLC, Hyannis, MA (US)

(72) Inventors: Michael C. Silva, East Sandwich, MA (US); Erick W. Drummond, Plymouth, MA (US); Nicholas J. Cipollo, Boston, MA (US)

(73) Assignee: Savant Systems, LLC, Hyannis, MA (US)

( * ) Notice: Subject to any disclaimer, the term of this patent is extended or adjusted under 35 U.S.C. 154(b) by 330 days.

(21) Appl. No.: 14/875,327

(22) Filed: Oct. 5, 2015

(65) Prior Publication Data

US 2017/0097651 A1    Apr. 6, 2017

(51) Int. Cl.
*G01M 1/38*    (2006.01)
*G05F 1/66*    (2006.01)
(Continued)

(52) U.S. Cl.
CPC .............. *G05F 1/66* (2013.01); *G05B 15/02* (2013.01); *H04L 12/2803* (2013.01);
(Continued)

(58) Field of Classification Search
CPC ....... G05F 1/66; H04L 67/22; H04L 12/2803; G05B 15/02
See application file for complete search history.

(56) References Cited

U.S. PATENT DOCUMENTS 4,506,144 A * 3/1985 Hesford .................... G05F 1/66
219/497
5,781,783 A * 7/1998 Gunther ................ G06F 1/3228
700/295

(Continued)

FOREIGN PATENT DOCUMENTS

DE    202012009494 A1    10/2012
EP    2051379 A1    4/2009
(Continued)

OTHER PUBLICATIONS

"Notification of Transmittal of the International Search Report and the Written Opinion of the International Searching Authority, or the Declaration," International Filing Date: Oct. 4, 2016, International Application No. PCT/US2016/055347, Applicant: Savant Systems, LLC., dated Dec. 21, 2016, pp. 1-14.

(Continued)

*Primary Examiner* — Adam Lee
(74) *Attorney, Agent, or Firm* — Cesari and McKenna, LLP; James A. Blanchette

(57) ABSTRACT

Techniques are provided for power optimization of home automation system devices (e.g., battery-powered devices). In one example embodiment, the power optimization is based on service states for a room associated with the device. A service state is determined for each of one or more services available in the room. The device is maintained in a low-power inactive state while there are no active services in the room. In response to at least one service being activated, the device transitions from the inactive state to a full-power in-use state. Such transition is performed preemptively, absent any current attempt to use the device by a user or another device. In response to expiration of a timer since a last use of the device or the transition to the in-use state was made and no actual use occurred, the device exits (Continued)

the in-use state and may eventually return to the inactive state.

13 Claims, 7 Drawing Sheets

(51) Int. Cl.
    *G05B 15/02*     (2006.01)
    *H04L 12/28*     (2006.01)
    *H04L 29/08*     (2006.01)

(52) U.S. Cl.
    CPC .......... *H04L 12/2807* (2013.01); *H04L 67/22* (2013.01); *H04L 2012/2847* (2013.01)

(56) References Cited

U.S. PATENT DOCUMENTS

| | | | |
|---|---|---|---|
| 5,926,404 A * | 7/1999 | Zeller | G06F 1/3228 713/320 |
| 6,516,421 B1 * | 2/2003 | Peters | G06F 1/3228 713/502 |
| 8,235,810 B2 * | 8/2012 | Brunet de Courssou | G07F 17/32 463/1 |
| 8,488,500 B2 | 7/2013 | Mukherjee et al. | |
| 8,803,799 B2 * | 8/2014 | Hu | G06F 1/3218 345/156 |
| 8,810,719 B2 * | 8/2014 | Hsu | G06F 1/3231 348/372 |
| 8,839,006 B2 * | 9/2014 | Li | G06F 1/3228 327/544 |
| 8,850,251 B1 * | 9/2014 | Maeng | G06F 1/3206 713/323 |
| 9,009,516 B1 * | 4/2015 | Gabayan | G06F 1/3206 713/323 |
| 9,110,671 B2 * | 8/2015 | Eckert | G06F 1/324 |
| 9,153,125 B2 | 10/2015 | Madonna et al. | |
| 2005/0210206 A1 * | 9/2005 | Woodbridge | G06F 12/0215 711/154 |
| 2006/0184287 A1 * | 8/2006 | Belady | G06F 1/3203 700/291 |
| 2007/0050654 A1 * | 3/2007 | Switzer | G06F 1/3203 713/320 |
| 2007/0113111 A1 * | 5/2007 | Dahan | G06F 1/3228 713/300 |
| 2007/0143801 A1 | 6/2007 | Madonna et al. | |
| 2008/0162968 A1 * | 7/2008 | Breen | G01S 5/0294 713/323 |
| 2008/0189420 A1 * | 8/2008 | Herrod | G06K 7/10326 709/227 |
| 2008/0270814 A1 * | 10/2008 | Starr | G06F 1/3203 713/323 |
| 2009/0312029 A1 * | 12/2009 | Ananthanarayanan | H04M 1/72519 455/450 |
| 2010/0100716 A1 * | 4/2010 | Scott | G06F 1/3209 713/1 |
| 2010/0218005 A1 * | 8/2010 | Jain | G06F 9/5094 713/300 |
| 2010/0235662 A1 * | 9/2010 | Nishtala | G06F 1/3203 713/322 |
| 2011/0055606 A1 * | 3/2011 | Wu | G06F 1/3203 713/323 |
| 2011/0060931 A1 * | 3/2011 | Radhakrishnan | G06F 1/3203 713/340 |
| 2011/0252252 A1 * | 10/2011 | Ramakrishnan | G06F 1/3284 713/320 |
| 2011/0264931 A1 * | 10/2011 | Chang | G06F 1/3209 713/310 |
| 2012/0110360 A1 * | 5/2012 | Lin | G06F 1/3215 713/324 |
| 2012/0191993 A1 * | 7/2012 | Drader | G06F 1/3215 713/320 |
| 2012/0274564 A1 * | 11/2012 | Cronjaeger | G06F 1/3259 345/166 |
| 2012/0284543 A1 * | 11/2012 | Xian | G06F 1/3203 713/320 |
| 2013/0036318 A1 * | 2/2013 | Reams | H04N 5/4403 713/322 |
| 2013/0042131 A1 * | 2/2013 | Berry | G06F 1/3206 713/323 |
| 2013/0099124 A1 * | 4/2013 | Filson | G05D 23/1902 250/349 |
| 2013/0198538 A1 * | 8/2013 | Diab | G06F 1/3278 713/310 |
| 2013/0198540 A1 * | 8/2013 | Lee | G06F 1/32 713/320 |
| 2013/0283025 A1 | 10/2013 | Madonna et al. | |
| 2013/0326250 A1 * | 12/2013 | Sullivan | G06F 1/3206 713/323 |
| 2013/0332760 A1 * | 12/2013 | Reece | G06F 1/206 713/323 |
| 2014/0059372 A1 * | 2/2014 | Guntur | G06F 1/3234 713/323 |
| 2014/0157026 A1 * | 6/2014 | So | G06F 1/3206 713/323 |
| 2014/0181556 A1 * | 6/2014 | Eckert | G06F 1/324 713/323 |
| 2014/0189410 A1 * | 7/2014 | Wolski | G06F 1/3206 713/324 |
| 2014/0347294 A1 * | 11/2014 | Hong | G06F 1/3262 345/173 |
| 2015/0085725 A1 | 3/2015 | Estevez et al. | |
| 2015/0100802 A1 * | 4/2015 | Thomas | G06F 1/3218 713/320 |
| 2015/0169036 A1 * | 6/2015 | Sodhi | G06F 1/3243 713/320 |
| 2015/0220131 A1 * | 8/2015 | Johansson | G06F 1/3287 713/323 |
| 2015/0341184 A1 | 11/2015 | Tatzel et al. | |
| 2016/0061469 A1 * | 3/2016 | Albonesi | H02J 3/14 700/276 |
| 2016/0124401 A1 * | 5/2016 | Li | G05B 15/02 700/275 |
| 2016/0154452 A1 * | 6/2016 | Hansson | G06F 1/3287 713/323 |
| 2016/0321183 A1 * | 11/2016 | Govindan | G06F 12/0862 |

FOREIGN PATENT DOCUMENTS

| | | |
|---|---|---|
| EP | 252118 A1 | 11/2010 |
| EP | 2354889 A1 | 8/2011 |
| WO | WO-2009-134894 A2 | 11/2009 |

OTHER PUBLICATIONS

Shah, Jalpa, et al., "Wireless Smart Power Saving System for Home Automation," Emerging Technology Trends in Electronics, Communication and Networking (ET2ECN), 2012 1$^{st}$ International Conference on, IEEE, Dec. 19, 2012, pp. 1-6.

Yingshi, Kang, "Electrical Power Anticipation for Smart Home Product Based on Evolutionary Algorithms," Computer Science and Information Technology (ICCSIT), 2010 3$^{rd}$ IEEE International Conference on, IEEE, Piscataway, NJ, USA, Jul. 9, 201, pp. 1-4.

* cited by examiner

HOME AUTOMATION SYSTEM DEVICE POWER OPTIMIZATION

BACKGROUND

Technical Field

The present disclosure relates generally to home automation systems and more specifically to power optimization of home automation system devices.

Background Information

Home automation systems are becoming increasingly popular in both residential and commercial buildings. Such systems may be capable of controlling, switching data between, and otherwise interacting with a wide variety of devices, including lighting devices, security devices, audio/video (A/V) devices, heating ventilation and cooling (HVAC) devices, and/or other types of devices.

Traditionally, home automation systems have required significant installed wiring, which has added to the cost and complexity of installations. For example, many existing home automation systems have relied upon a wired (e.g., Ethernet) local area network (LAN) to exchange control messages between a controller and the devices of the home automation system that are under the controller's control. As such, control wiring was often required throughout the structure. The need to install such wiring made it difficult for homeowners and less-skilled general purpose installers to install many traditional home automation systems.

More recently, some home automation systems have begun to use wireless LANs (e.g., Wi-Fi) as their primary means for exchanging control messages. However, the use of wireless networking technology has not fully addressed the issue of wiring, as home automation system devices still generally require power. For many devices, such power takes the form of alternating current (A/C) power from dedicated in-wall wiring or power cords to wall outlets. If there are not existing wall outlets in the desired locations, unsightly extension cords or new in-wall wiring may be required.

To address the wiring issue in home automation systems, some attempts have been made to use battery-powered home automation system devices. While this may allow for a clean install, the limited power capacity of batteries presents its own set of problems. Some devices may draw significant power, leading to short battery life, and a frequent need to recharge or replace batteries. In attempts to lessen this burden, power optimization techniques may be employed that detect when a device has been inactive for some set period of time, and trigger the device to enter a low-power state (e.g., a sleep state). When an attempt to use the device is detected, the device may wake from the low-power state, power up, and then handle the task at hand.

However, exiting the low-power state (e.g., a sleep state) when there is an attempt to use the device may introduce unacceptable amounts of delay (e.g., control lag), causing the home automation system to feel unresponsive. There may be significant delay (e.g., hundreds of milliseconds or even seconds) until the device can recognize the attempt at use, exit the low-power state (e.g., sleep state), and then take the appropriate action. Unresponsiveness may impair the user experience, hindering the deployment of battery-powered devices as a replacement for wired devices.

Accordingly, there is a need for improved techniques for power optimization of home automation system devices, including battery-powered devices, that may conserve power while ensuring responsiveness.

SUMMARY

Example techniques are provided for power optimization of a home automation system device (e.g., a battery-powered device) based on service states for a room associated with the device, or other user activity. Such techniques may transition the device preemptively to a full-power in-use power state, when it is likely that the device will be used (but before any current attempt to use the device). In such manner, the device may be prepositioned to quickly respond when a user or another device should try to interact with it.

In an example embodiment, a host controller of the home automation system determines a service state for each of one or more services available in a room of a structure (e.g., a residential dwelling or commercial building) that is associated with the device. The host controller may configure the device to be maintained by default in a low-power inactive state while there are no active services in the room. When in the inactive state, the device may duty cycle one or more hardware components (e.g., a Bluetooth low energy (BLE) adaptor, a microcontroller, etc.) according to a first sleep interval (e.g., 1000 milliseconds (ms)). In response to at least one service being activated in the room, the host controller may signal the device to preemptively transition from the inactive state to a full-power in-use state. When in the in-use state, the device may duty cycle the one or more hardware components according to a second sleep interval (e.g., 15 ms) that may have a length that is at least two orders of magnitude less than the first sleep interval. The transition may be performed absent any current attempt to use the device by a user or another device of the home automation system, to prime the device to be able to quickly respond should the user or another device try to interact with it. The device may remain in the in-use state until an internal timer (e.g., a 60 second timer) expires since a last use of the device or since entering the state and no use occurring. Then, the device may transition to a moderate-power active state. When in the active state, the device may duty cycle the one or more hardware components according to a third sleep interval (e.g., 150 ms) that may have a length that is at least an order of magnitude less than the first sleep interval, but is longer than the second sleep interval. The host controller may signal the device when there are no active services in the room, and, in response thereto, the device may transition from the active state back to the inactive state. A variety of other state transitions may also be possible.

In other embodiments, power usage is optimized based on user activity other than, or in addition to, the service state for the room associated with the device. The other user activity looked to may take a variety of different forms. In one alternative embodiment, the user activity is the user navigating to a screen for controlling the room associated with the device in a control user interface (UI). In another alternative, the user activity is the user using a second device (e.g., a remote control) of the home automation system that is associated with (e.g., bound to) the room associated with the device. In still another alternative, the user activity is detecting presence of the user within the room associated with the device using a presence detection system. In yet another alternative, the user activity is an indication of probable use in the room based on an activity history.

The host may configure the device to be maintained by default in the low-power inactive state. In response to determining there is user activity related to the room according to any one of the above discussed alternatives, the host controller may signal the device to preemptively transition from the low-power inactive state to the full-power in-use state. The transition may be performed absent any current attempt to use the device by a user or another device of the home automation system. The device may remain in the in-use state until an internal timer expires since a last use of the device or since entering the state and no use occurring. Then the device may transition to a moderate-power active state. The host controller may signal the device when there is no user activity related to the room, and in response thereto the device may transition from the active state back to the inactive state.

It should be understood that a variety of additional features and alternative embodiments may be implemented other than those discussed in this Summary. This Summary is intended simply as a brief introduction to the reader, and does not indicate or imply that the examples mentioned herein cover all aspects of the disclosure, or are necessary or essential aspects of the disclosure.

BRIEF DESCRIPTION OF THE DRAWINGS

The description below refers to the accompanying drawings of example embodiments, of which.

DETAILED DESCRIPTION

Definitions

As used herein, the term "home automation system" should be interpreted broadly to encompass various types of home control, "smart home", and/or device control systems that may control devices (e.g., lighting devices, security devices, A/V devices, HVAC devices, electronic door locks, and/or other types of devices) within a structure, such as a residential dwelling or commercial building. A home automation system may control a variety of different types of devices, or devices of only a particular type (e.g., only lighting devices, only A/V devices, etc.).

As used herein, the term "mobile device" refers to an electronic device that executes a general-purpose operating system and is adapted to be transported on one's person. Devices such as smartphones and tablet computers should be considered mobile devices. Desktop computers, servers, or other primarily-stationary computing devices generally should not be considered mobile devices.

As use herein, the term "service" refers to an activity offered by a home automation system that involves interactions between one or more devices of a home automation system. A service may, but need not, correspond to one or more unique paths between devices that are used to provide the activity (e.g., audio and video paths from source devices to output devices). An example of a service may be a "Cable TV" service that corresponds to paths between a cable box and a television, that are utilized to provide a cable television viewing activity.

As use herein, the term "room" refers to an interior portion of a structure or an exterior space associated with a structure, in which one or more services may be provided. A room may correspond to a single physical room of the structure, an aggregation of multiple physical rooms of the structure, a sub-portion of a physical room of the structure, or a particular delineation of exterior space associated with the structure.

An Example Home Automation System

Figure 1:
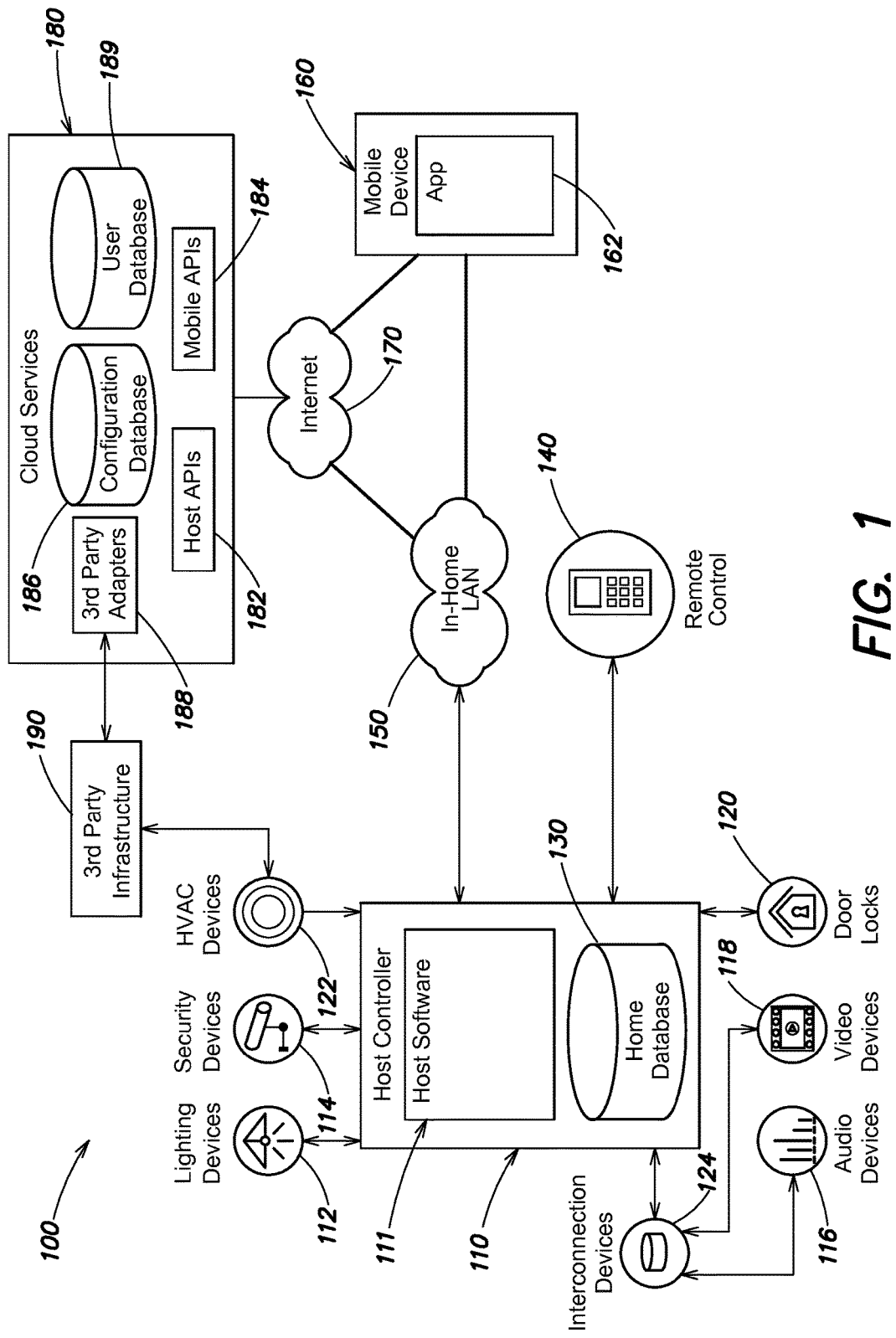
FIG. 1 is a block diagram of an example architecture of a home automation system operable to control devices about a structure.

FIG. 1 is a block diagram of an example architecture 100 of a home automation system operable to control devices about a structure (e.g., a residential dwelling or commercial building). At the core of the system is a host controller 110 coupled to an in-home local area network (LAN) (e.g., a Wi-Fi network) 150. The host controller may include hardware components such as a processor, a memory and a storage device, which collectively store and execute host software 111 configured to monitor the control the operations of devices 112-124, as well as to provide UI interpretation, system administration and monitoring, synchronization with cloud services 180 and mobile devices 160, activity recording, activity prediction and other types of functionality.

The host controller 110 may maintain in its storage device a home database 130 that stores configuration information including services the home automation system is configured to provide, user content such as scenes that are configured for a user of the home automation system, media content associated with a user of the home automation system (e.g., favorites), system state information indicating a present condition of the home automation system, as well as other types of data. The home database 130 may further maintain a record of historical activity in the home automation system. Such portion of the home database may be referred to as a history database.

The devices 112-124 of the home automation system may include lighting devices 112, such as lighting controllers, lamp modules, dimmer modules, switches, keypads, fan controllers and the like; security devices 114, such as home monitors/cameras, motion sensors, home healthcare sensors, related controllers and the like; audio devices 116 and video devices 118 (collectively A/V devices), such as A/V device controllers, media servers, audio amplifiers, cable boxes, and the like; electronic door locks 120 and other types of motor or relay operated devices; HVAC devices 122, such as thermostats; interconnection devices 124, such as IR blasters, matrix switchers, signal extenders and the like, as well as other types of home automation system devices. At least some of the devices 112-124 may be battery-powered. Each of the devices 112-124 may be associated with (i.e. configured to be used in connection with) a room. The devices 112-124 may physically reside in the room with which they are associated or reside elsewhere (e.g., a remote equipment rack).

Depending on the implementation, the communications capabilities of the devices 112-124 of the home automation system may vary. For example, at least some of the devices may include both a LAN interface (e.g., a Wi-Fi adaptor) to enable them to communicate with the host controller 110 and other devices via the in-home LAN 150 (e.g., Wi-Fi), or a wireless personal area network (WPAN) interface (e.g., a BLE adaptor) to enable them to communicate with the host controller 110 and other devices via a WLAN (not shown). Likewise, some devices may only have ports or transceivers for wired or point-to-point wireless communication (e.g., RS-232, relay or general-purpose input/output (GPIO) ports, infrared (IR) transceivers, etc.) and communicate with the host controller 110 and other devices using such ports. Some of the devices (e.g., an interconnection device such as an IR blaster) may include both a WPAN interface (e.g., a BLE adaptor) to enable them to communicate with the host controller 110 and a point-to-point wireless transceiver (e.g., an IR transceiver) for communicating with other devices (e.g., A/V devices 116, 118) of the home automation system. Further, some devices may include a LAN interface (e.g., a Wi-Fi interface), but not be configured to communicate with the host controller 110 directly over the in-home LAN 150, but instead communicate via Internet 170, cloud services 180 and third party infrastructure 190. It should be understood that while HVAC devices 122 are shown in FIG. 1 as an example of one type of device that may communicate in this manner, other types of devices 112-124 may alternatively use this method of communication, and vice versa.

A user may control the home automation system using a remote control 140 that communicates with the host controller 110 through the in-home LAN 150 (e.g., via Wi-Fi) or directly with the host controller 110 via point-to-point wireless signals (e.g. via IR or radio frequency RF signals). The remote control 140 may include hardware components such as a processor, a memory and a storage device, which store and execute software (e.g., an application (app)) configured to interface with the host controller 110 and cloud services 180, and generate and display a home automation control UI, among other functionality. The remote control 140 may further include a display screen (e.g., a touch screen) for showing the control UI, and input devices (e.g., buttons, a touch sensor of the touch screen, etc.) for receiving user input related to the control UI.

A user may further control the home automation system using a mobile device 160 that communicates with the host controller 110 via the in-home LAN 150 or using a mobile data connection to the Internet 170. The mobile device 160 may include hardware components such as a processor, a memory and a storage device, which store and execute an app 162 (e.g., a mobile app) configured to interface with the host controller 110 and/or cloud services 180, and generate and display a home automation control UI, among other functionality. The mobile device 160 may further include a display screen (e.g., a touch screen) for showing the control UI, and an input device (e.g., a touch sensor of the touch screen) for receiving user input related to the control UI.

The host device 110 and mobile device 160 may communicate via the Internet 170 with cloud services 180 and its host application program interfaces (APIs) 182 and mobile APIs 184. The cloud services 180 may provide remote access to home automation control, a persistent backup of the home database 130 (storing data in a configuration database 186), interfaces to third party infrastructure (via third party adaptors 188), user profiles and usage tracking (storing data in user database 189), a mechanism for over-the-air updates, host crash reporting, and license management, among other functions.

Figure 2:
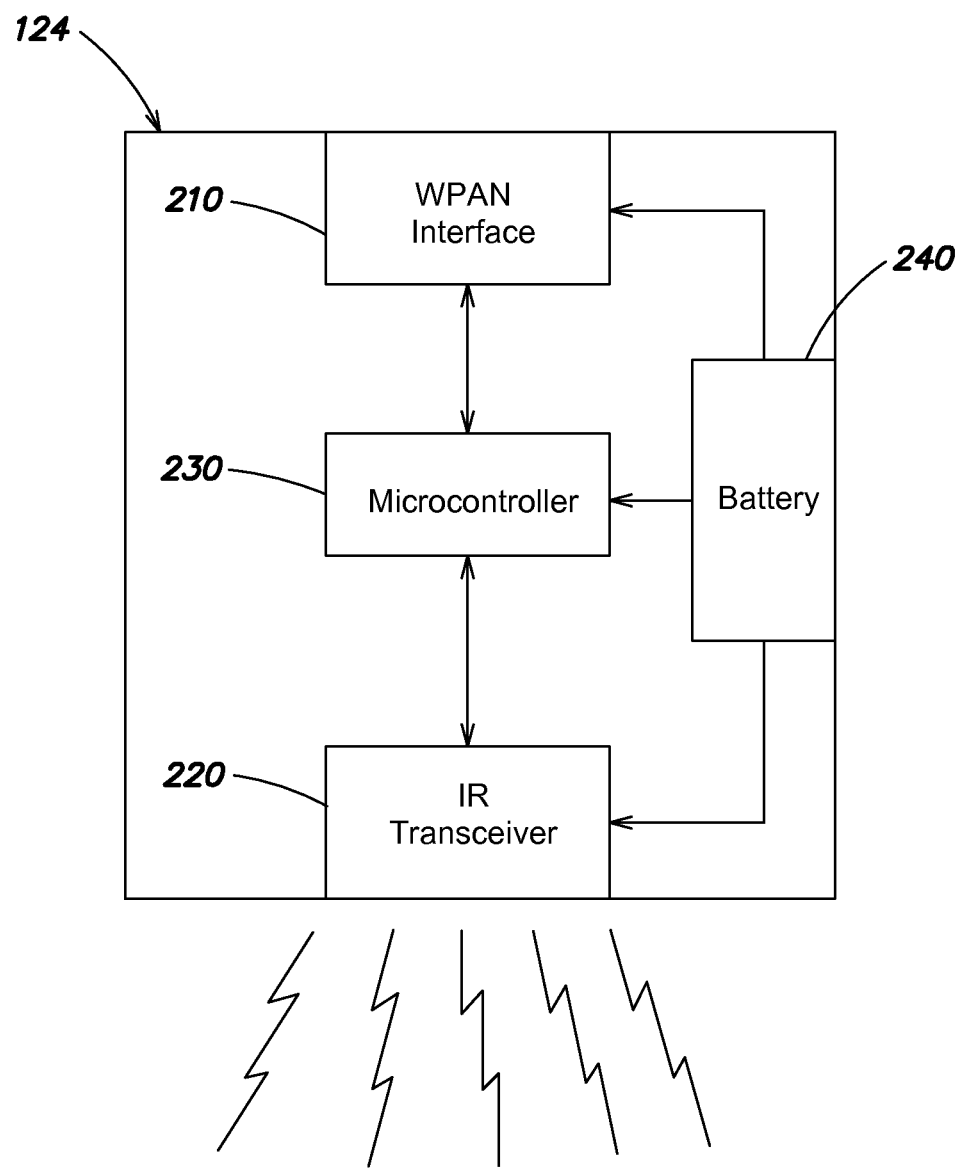
FIG. 2 is a block diagram of a battery-powered interconnection device of the home automation system that may serve as an illustrative example of one type of device that may be power optimized according to the techniques described herein.

FIG. 2 is a block diagram of a battery-powered interconnection device (e.g., an IR blaster) 124 of the home automation system, that may serve as an illustrative example of one type of device that may be power optimized according to the techniques described herein. The device 124 may include various hardware components, such as a WPAN interface (e.g., a BLE adaptor) 210, an IR transceiver 220 and a microcontroller 230, among others. During initial configuration, the WPAN interface 210 may be used to receive configuration programming from the host controller 110, including power optimization programming that sets a default power optimization state, indicates timer values for certain transitions between power optimization states, and defines other parameters. During ongoing use, the WPAN interface 210 may be used to receive control messages from the host controller 110 regarding desired operations of A/V devices 116, 118, as well as signals that indicate when certain transitions should be made between power optimization states (e.g., based on service states, or other user activity).

The IR transceiver 230 may be configured to send IR commands to the A/V devices 116, 118 of the home automation system to cause them to perform desired actions. The IR commands may be based on the control messages from the host controller 110 regarding desired operations of A/V devices 116, 118.

The WPAN interface 210 and IR transceiver 220 may operate under the control of the microcontroller 230, which may be programmed to generate appropriate IR commands for the IR transceiver 220 in response to control messages received on the WPAN interface 210, among other operational functions. The microcontroller 230 may also be programmed to manage power drain from a battery 240 (e.g., a commodity alkaline battery) by the hardware components of the device 124. To conserve power, the microcontroller 230 may transition the device 124 among multiple power optimization states (e.g., a low-power inactive-state, a moderate-power active state, and a full-power in-use state), which (among other possible power conservation measures) may duty cycle one or more hardware components (e.g., the WPAN interface 210, the microcontroller 230, etc.) according to sleep intervals.

A low-power inactive state may be programmed as a default state of the device 124, and utilize a sleep interval on the order of thousands of milliseconds (e.g., 1000 ms). Such a sleep interval may allow for low power usage (e.g., 1 mA of power drain), however, there may be noticeable delay (e.g., control lag) should messages be sent to the device 124 while it is in this state. Accordingly, such state may be appropriate only for when the device 124 is likely not to be used.

A moderate-power active state may utilize a sleep interval on the order of hundreds of milliseconds (e.g., 150 ms). Such a sleep interval may allow for moderate power usage, and provide slight, but generally unnoticeable delay should messages be sent to the device 124 while in this state. Accordingly, such state may be appropriate for when the device 124 is somewhat likely to be used, providing a reasonable level of responsiveness.

A full-power in-use state may utilize a sleep interval on the order of tens of milliseconds (e.g., 15 ms). Such a sleep interval may be considered to utilize "full-power" even though the device sleeps at some times, as it is the highest power consumption state provided in the available power optimization state. The in-use state may provide the highest level of responsiveness slight, (e.g., no noticeable delay). Accordingly, such state may be appropriate for when the device 124 is very likely to be used.

Power Optimization State Transitions

The microcontroller 230 of the device 124 may be programmed (e.g., by the host controller 110) to maintain the device in the inactive state most of the time, and transition preemptively to the in-use state when it is very likely the device will be used (e.g., based on service states, or other user activity, for a room associated with the device), but before any actual current attempt to use the device. The microcontroller 230 may further be programmed (e.g., by the host controller 110) to maintain the device 124 in the active state when it is somewhat likely the device 124 will be used (e.g., based on expiration of an internal timer since a last use of the device or since entering the in-use state and no use occurring). Various other transitions may be provided as detailed below.

Figure 3:
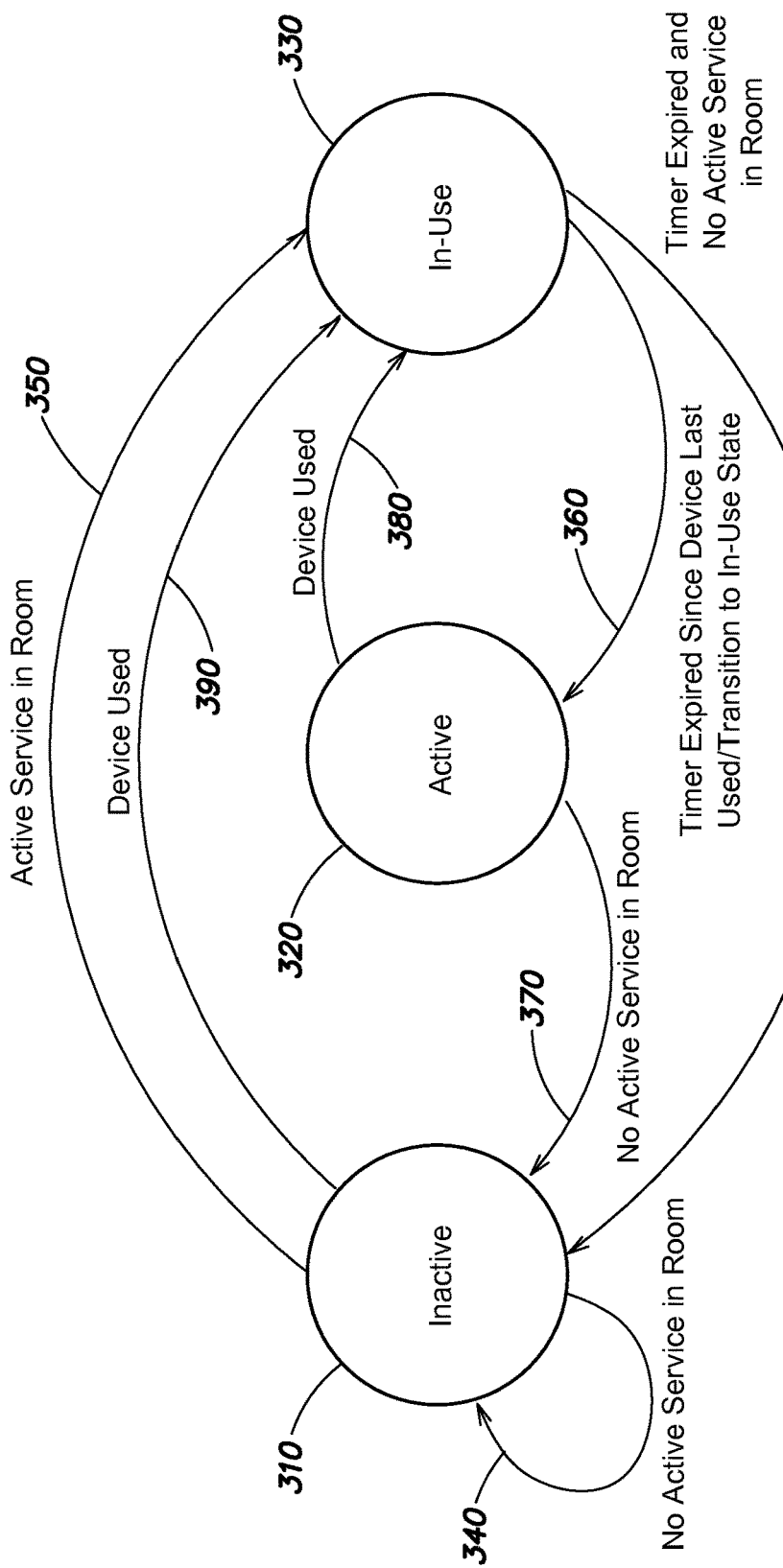
FIG. 3 is a transition diagram of an example power optimization technique for a device based on service states for a room associated with the device.

FIG. 3 is a transition diagram of an example power optimization technique for a device 124 based on service states for a room associated with the device. The transitions may be programmed into the micro controller 230. By default, the microcontroller 230 may maintain the device 124 in the low-power inactive state 310, while there are no active services in the room, looping at transition 340. In response to at least one service being activated in the room, the host controller 110 may signal the device 124. The service need not actually use the device 124 (e.g., the device may not be on one or more unique paths between devices associated with the service). Rather, the service may simply serve as an indicia of user activity in the room. At transition 350, the microcontroller 230 may preemptively transition the device from the inactive state 310 to the full-power in-use state 330. The transition may be performed absent any current attempt to use the device 124. The microcontroller 230 may maintain an internal timer (e.g., a 60 seconds timer) that runs since a last use of the device (e.g., a last IR command sent) or the transition to the in-use state 330 was made and no actual use occurred. In transition 360, in response to expiration of the timer, the microcontroller 230 may transition the device 124 to the moderate-power active state 320. The host controller 110 may signal the device when there are no active services in the room. At transition 370, in response to there being no active services in the room, the microcontroller 230 may transition the device 124 from the active state 320 back to the inactive state 310. Transitions 360 and 370 may be combined into a single transition 395 directly to the inactive state 310 when both conditions are met. At transition 380, if the device 124 is used (e.g., is requested to send an IR command) while in the active state 320, the microcontroller 230 may transition the device to the in-use state 330. Likewise, at transition 390, if the device 124 is used (e.g., is requested to send an IR command) while the device is in the inactive state 310 (e.g., an unexpected use of the device), the microcontroller 230 may transition the device to the in-use state 330.

Alternatively, the user activity may take a form other than service state for the room associated with the device 124. In one alternative, the user activity may be the user navigating to a screen for controlling the room associated with the device in a control UI of an app 162 that is displayed on the mobile device 160 or that is displayed on a remote control 140 used to control the home automation system.

Figure 4:
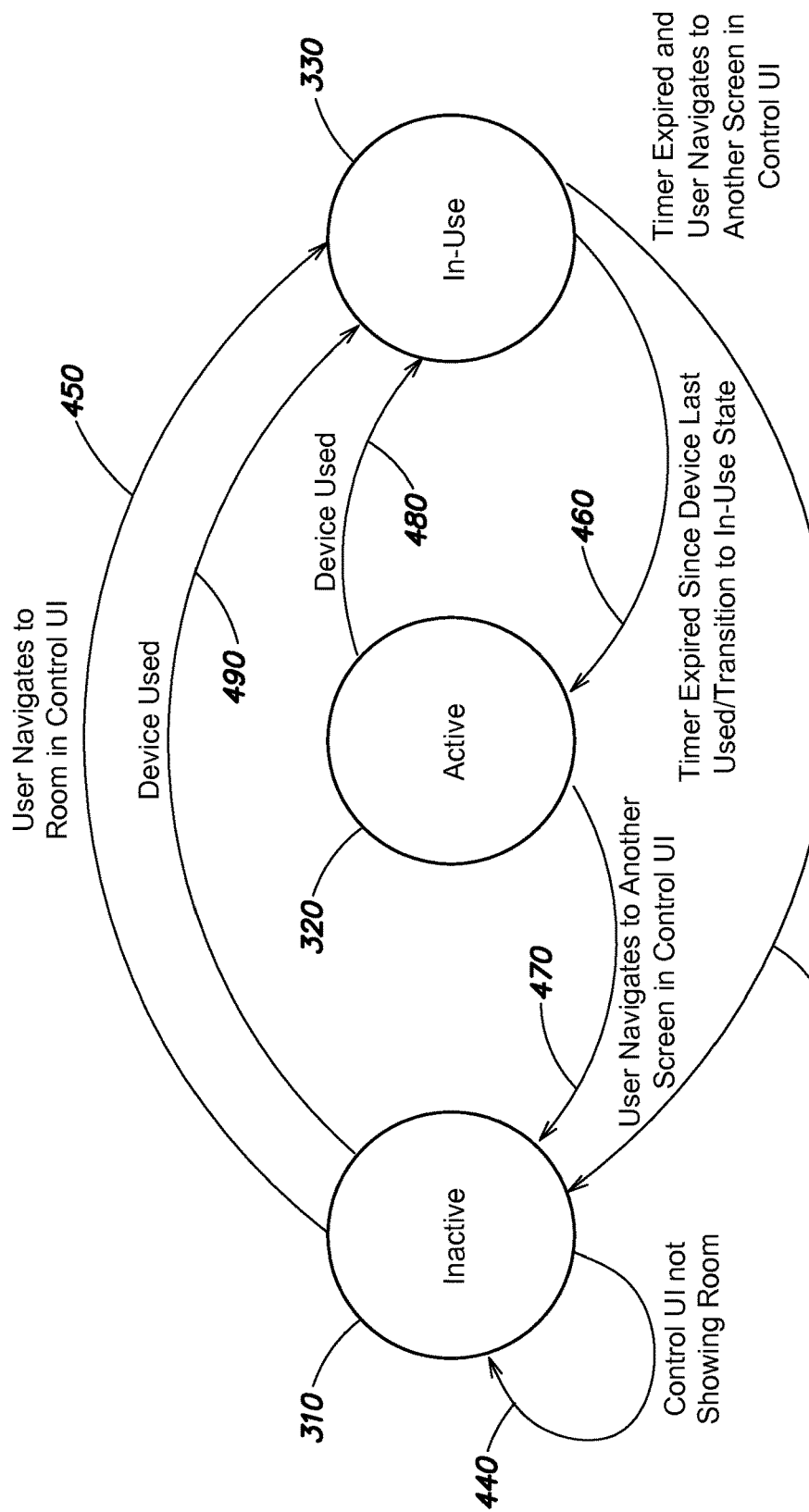
FIG. 4 is a transition diagram of an example power optimization technique for a device based on a user navigating to a screen for controlling a room associated with the device in a control UI.

FIG. 4 is a transition diagram of an example power optimization technique for a device 124 based on a user navigating to a screen for controlling the room associated with the device in a control UI. By default, the microcontroller 230 may maintain the device 124 in the low-power inactive state 310, while the control UI is not showing a screen for controlling the room (e.g., is showing a screen for controlling another room), looping at transition 440. In response the user navigating to a screen for controlling the room in the control UI, the host controller 110 may signal the device 124, and at transition 450, the microcontroller 230 may preemptively transition the device from the inactive state 310 to the full-power in-use state 330. The transition may be performed absent any current attempt to use the device 124. The microcontroller 230 may maintain an internal timer (e.g., a 60 second timer) that runs since a last use of the device (e.g., a last IR command sent) or the transition to the in-use state 330 was made and no actual use occurred. In transition 460, in response to expiration of the timer, the microcontroller 230 may transition the device 124 to the moderate-power active state 320. The host controller 110 may signal the device when the user navigates to another screen in the control UI (e.g., a screen for controlling another room). At transition 470, in response the user navigating away from the screen for controlling the room in the control UI (e.g., to a screen for controlling another room), the microcontroller 230 may transition the device 124 from the active state 320 back to the inactive state 310. Transitions 460 and 470 may be combined into a single transition 495 directly to the inactive state 310 when both conditions are met. At transition 480, if the device 124 is used (e.g., is requested to send an IR command) while in the active state 320, the microcontroller 230 may transition the device to the in-use state 330. Likewise, at transition 490, if the device 124 is used (e.g., is requested to send an IR command) while the device is in the inactive state 310 (e.g., an unexpected use of the device), the microcontroller 230 may transition the device to the in-use state 330.

In another alternative, the user activity may be the user using a second (i.e., different) device associated with the room. For example, the second, different device may be the remote control 140, which may be bound to the room associated with the device 124 (e.g., configured specifically to control services in that room).

Figure 5:
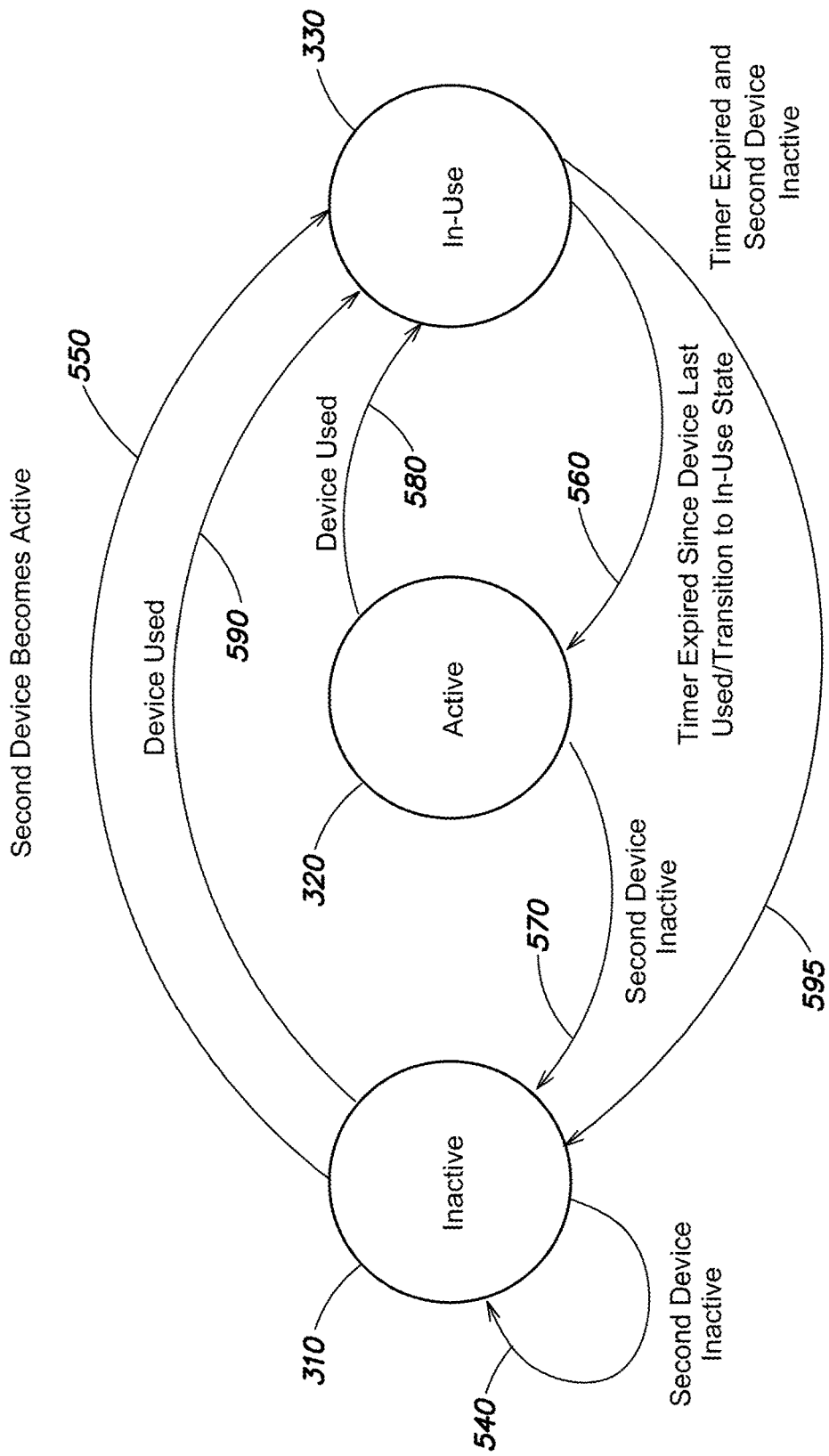
FIG. 5 is a transition diagram of an example power optimization technique for a device based on use of a second device associated with the room.

FIG. 5 is a transition diagram of an example power optimization technique for a device 124 based on use of a second device associated with the room. By default, the microcontroller 230 may maintain the device 124 in the low-power inactive state 310, while the second device (e.g., remote control 140) is inactive, looping at transition 540. Upon use of the second device (e.g., a user pressing a button on the remote control 140), a notification may be sent to the host controller 110 and the host controller may signal the device to preemptively transition from the inactive state 310 to the full-power in-use state 330, at transition 550. The transition may be performed absent any current attempt to use the device 124. The microcontroller 230 may maintain an internal timer (e.g., a 60 second timer) that runs since a last use of the device (e.g., a last IR command sent) or the transition to the in-use state 330 was made and no actual use occurred. In transition 560, in response to expiration of the timer, the microcontroller 230 may transition the device 124 to the moderate-power active state 320. The host controller 110 may determine when the second device (e.g., remote control 140) becomes inactive (e.g., the user has not pressed a button on the remote control 140 for a predetermined length of time), and signal the device 124 to transition from the active state 320 back to the inactive state 310, at transition 570. Transitions 560 and 570 may be combined into a single transition 595 directly to the inactive state 310 when both conditions are met. At transition 580, if the device 124 is used (e.g., is requested to send an IR command) while in the active state 320, the microcontroller 230 may transition the device to the in-use state 330. Likewise, at transition 590, if the device 124 is used (e.g., is requested to send an IR command) while the device is in the inactive state 310 (e.g., an unexpected use of the device), the microcontroller 230 may transition the device to the in-use state 330.

In still another alternative, the user activity may be presence of the user within the room associated with the device 124, detected by a presence detection system. The presence detection system may take any of a variety of forms, including interior motion sensors/home monitors, a Bluetooth-based indoor positioning system, a Wi-Fi-based indoor positioning system, manual user location reporting, etc.

Figure 6:
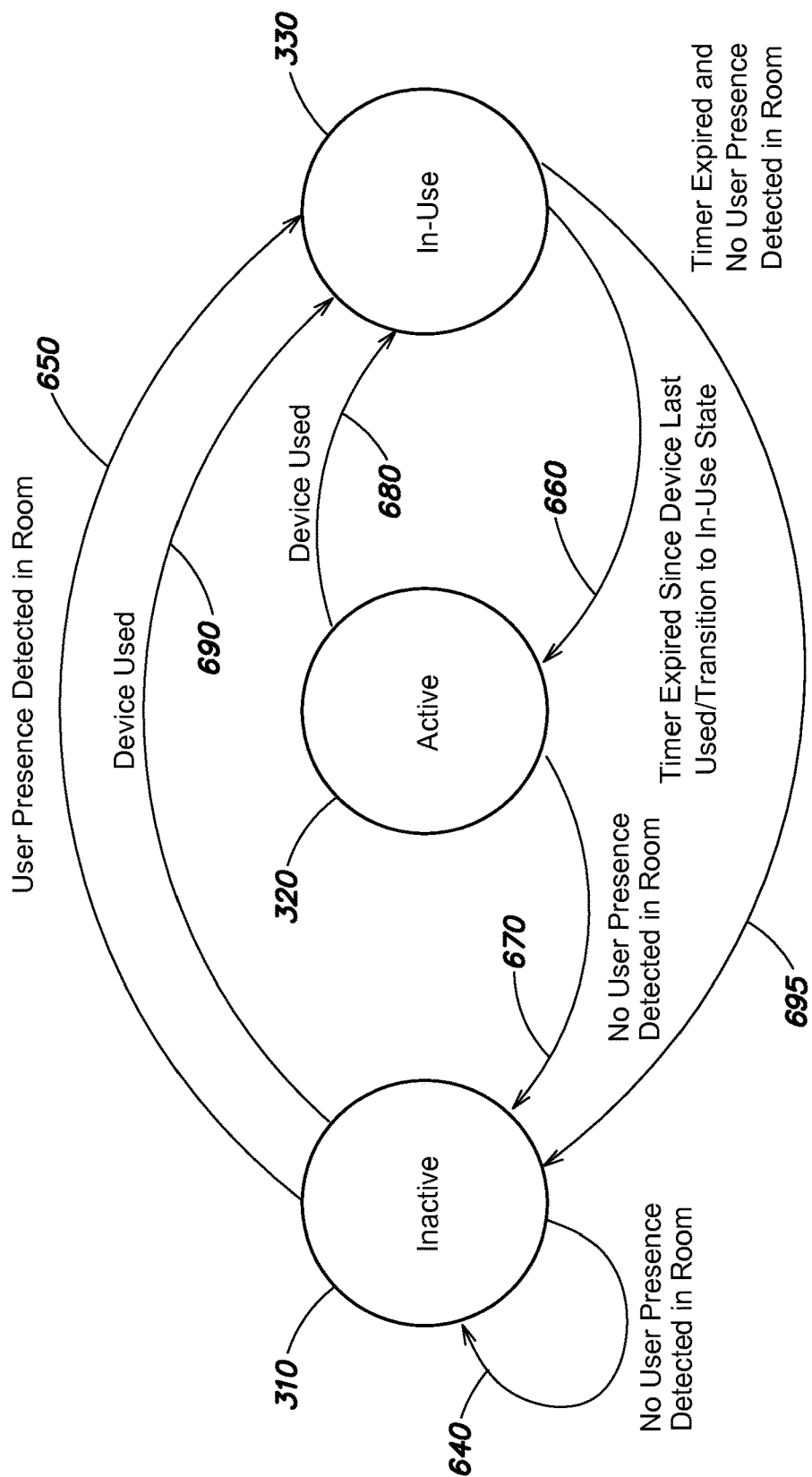
FIG. 6 is a transition diagram of an example power optimization technique for a device based on user presence detection.

FIG. 6 is a transition diagram of an example power optimization technique for a device based on user presence detection. By default, the microcontroller 230 may maintain the device 124 in the low-power inactive state 310, while user presence is not detected in the room associated with the device, looping at transition 640. In response to a presence detection system detecting the user in the room, the host controller 110 may signal the device 124, and at transition 650, the microcontroller 230 may preemptively transition the device from the inactive state 310 to the full-power in-use state 330. The transition may be performed absent any current attempt to use the device 124. The microcontroller 230 may maintain an internal timer (e.g., a 60 second timer) that runs since a last use of the device (e.g., a last IR command sent) or the transition to the in-use state 330 was made and no actual use occurred. In transition 660, in response to expiration of the timer, the microcontroller 230 may transition the device 124 to the moderate-power active state 320. The host controller 110 may signal the device when the user presence is no longer detected in the room. At transition 670, in response to a lack of user presence, the microcontroller 230 may transition the device 124 from the active state 320 back to the inactive state 310. Transitions 660 and 670 may be combined into a single transition 695 directly to the inactive state 310 when both conditions are met. At transition 680, if the device 124 is used (e.g., is requested to send an IR command) while in the active state 320, the microcontroller 230 may transition the device to the in-use state 330. Likewise, at transition 690, if the device 124 is used (e.g., is requested to send an IR command) while the device is in the inactive state 310 (e.g., an unexpected use of the device), the microcontroller 230 may transition the device to the in-use state 330.

In yet another alternative, the user activity may be the an indication of probable use based on an activity history maintained in a history database (e.g., a portion of the home database 130). As discussed above, a history database may record events that occurred in the home automation system at various prior times. Based on a comparison of a present time (e.g., present time of day and a present day of week) with a time of each of the events (e.g., a time of day and a day of week of each event), the host controller 110 may determine whether it is probable that the device 124 will be used. The comparison may look for events involving the room of the device 124 that occurred on a same day of the week as the present day of week, in a time window that encompasses the present time of day on any day of the week, or in a time window that encompasses the present time of day on a same day of the week as the present day of the week.

Figure 7:
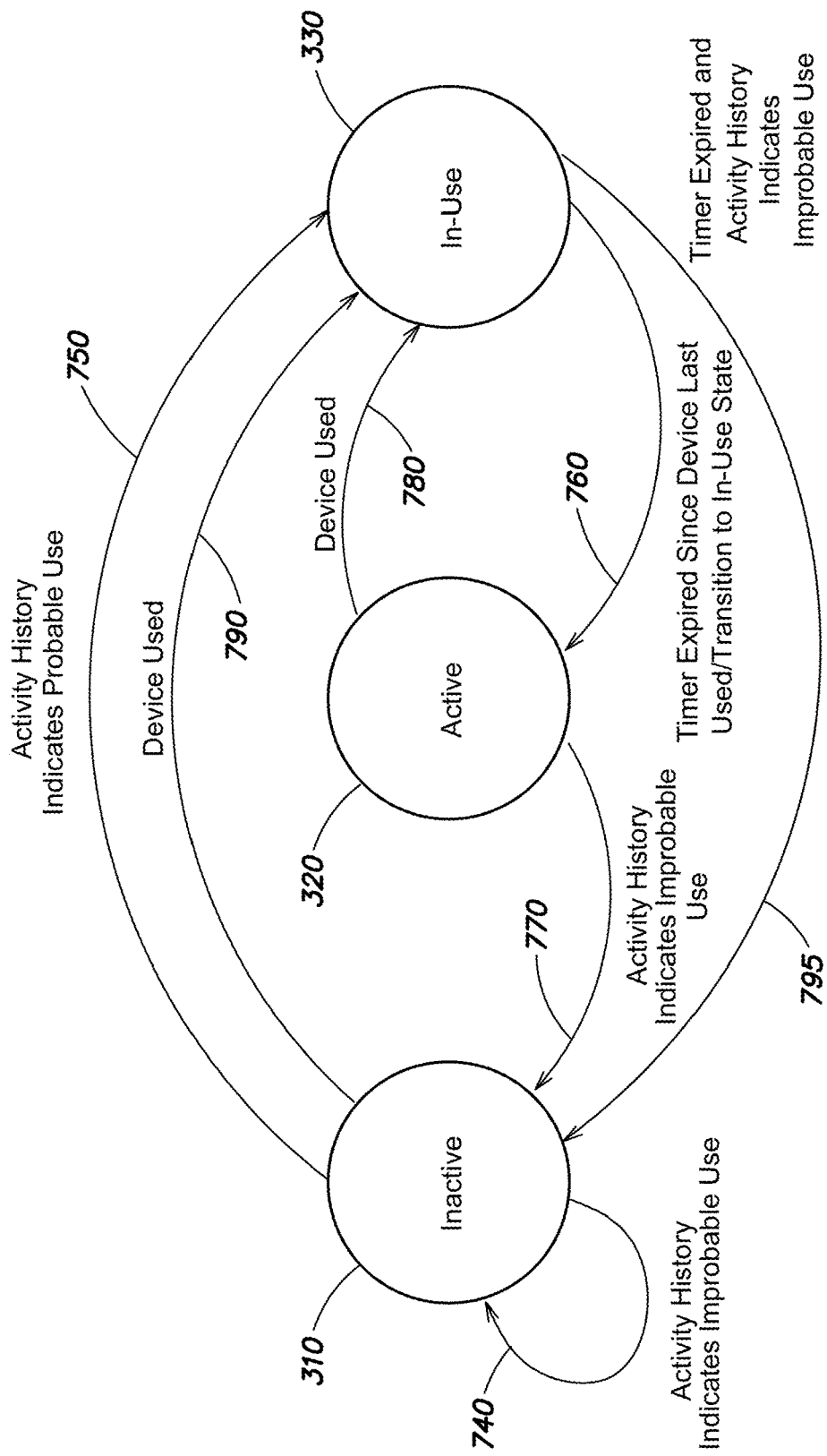
FIG. 7 is a transition diagram of an example power optimization technique for a device based on an activity history.

FIG. 7 is a transition diagram of an example power optimization technique for a device 124 based on an activity history. By default, the microcontroller 230 may maintain the device 124 in the low-power inactive state 310 while the activity history indicates it is improbable the device 124 will be used, looping at transition 740. The host controller 110 may notify the device 124 when the activity history indicates probable use of the device, and at transition 750, the microcontroller 230 may preemptively transition the device from the inactive state 310 to the full-power in-use state 330. The transition may be performed absent any current attempt to use the device 124. The microcontroller 230 may maintain an internal timer (e.g., a 60 seconds timer) that runs since a last use of the device (e.g., a last IR command sent) or the transition to the in-use state 330 was made and no actual use occurred. In transition 760, in response to expiration of the timer, the microcontroller 230 may transition the device 124 to the moderate-power active state 320. The host controller 110 may notify the device 124 when the activity history indicates improbable use of the device and, at transition 770, the microcontroller 230 may transition the device 124 from the active state 320 back to the inactive state 310. Transitions 760 and 770 may be combined into a single transition 795 directly to the inactive state 310 when both conditions are met. At transition 780, if the device 124 is used (e.g., is requested to send an IR command) while in the active state 320, the microcontroller 230 may transition the device to the in-use state 330. Likewise, at transition 790, if the device 124 is used (e.g., is requested to send an IR command) while the device is in the inactive state 310 (e.g., an unexpected use of the device), the microcontroller 230 may transition the device to the in-use state 330.

CONCLUSIONS

It should be understood that various adaptations and modifications may be made to the above discussed techniques for power optimization. While embodiments discussed above may involve a home automation system that includes a variety of different types of devices, such as lighting devices, security devices, A/V devices, electronic door locks, HVAC devices, etc., it should be remembered that the techniques may be adapted for use with more limited types of home automation systems. For example, the techniques may be used with a home automation system that provides only lighting control (i.e., a lighting control system), a home automation system that provides only A/V control (i.e., an A/V control system), etc.

While an interconnection device 124 (such as an IR blaster) is discussed above as an example of one type of device that may be power optimized based using the described techniques, it should be understood that the techniques may be used with various other devices of the home automation system, including devices 112-122 and, at least in some cases, remote control 140 (the remote control itself being considered a device).

Further, while it is discussed above that the techniques may be used with battery-powered devices (e.g., a battery-powered interconnection device 124, such as a battery-powered IR blaster) it should be remembered that the techniques may be used with wired devices as well, to achieve power conservation, reduce heat generation, or other goals independent of conserving battery power.

Still further, it is discussed that various software processes may execute on particular devices (such as on the host controller 110, device 124, etc.), it should be understood that software processes may be executed on different hardware, including on cloud-based hardware as part of cloud services 180.

Additionally, it should be understood that at least some of the functionality suggested above to be implemented in software may be implemented in hardware. In general functionality may be implemented in software, hardware or various combinations thereof. Software implementations may include electronic device-executable instructions (e.g., computer-executable instructions) stored in a non-transitory electronic device-readable medium (e.g., a non-transitory computer-readable medium), such as a volatile or persistent memory, a hard-disk, a compact disk (CD), or other tangible medium. Hardware implementations may include logic circuits, application specific integrated circuits, and/or other types of hardware components. Further, combined software/hardware implementations may include both electronic device-executable instructions stored in a non-transitory electronic device-readable medium, as well as one or more hardware components, for example, processors, memories, etc. Above all, it should be understood that the above embodiments are meant to be taken only by way of example.

What is claimed is:

1. A method for providing power optimization in a home automation system, comprising:
    maintaining a device of the home automation system that is associated with a room in a low-power state, the device being an audio/video (A/V) device, a lighting device, a heating ventilation and cooling (HVAC) device, a security device or an interconnection device;
    determining a user has navigated to a screen for controlling the room in a control user interface (UI) of the home automation system displayed on a remote control or a mobile device;
    in response to at least the user navigating to the screen for controlling the room in the control UI, and before an attempt to use the device by the user or another device of the home automation system in providing a service in the room, transitioning the device preemptively from the low-power state to a full-power state; and
    in response to expiration of a timer since a) a last use of the device was made while the device was in the full-power state or b) the transition of the device to the full-power state was made and no actual use of the device occurred, and the user navigating away from the screen for controlling the room in the control UI to a different screen for controlling another room in the control UI, exiting the full-power state.

2. The method of claim 1, wherein the exiting further comprises:
    transitioning the device to an active state that uses an amount of power intermediate between the low-power state and the full-power state.

3. The method of claim 1, wherein the device is a battery-powered device.

4. The method of claim 3, wherein the battery-powered device is a battery-powered Infrared (IR) blaster.

5. The method of claim 1, further comprising:
    when in the low-power state, duty cycling one or more hardware components of the device according to a first sleep interval; and
    when in the full-power state, duty cycling the one or more hardware components according to a second sleep interval, the second sleep interval having a length that is shorter than the first sleep interval.

6. The method of claim 5, further comprising:
    in response to the expiration of the timer, transitioning the device to an active state;
    when in the active state, duty cycling the one or more hardware components of the device according to a third sleep interval, wherein the third sleep interval has a length that is intermediate between the first sleep interval and the second sleep interval; and
    in response to detecting the user navigating away from the screen, transitioning the device from the active state to the low-power state.

7. A method for providing power optimization in a home automation system, comprising:
    monitoring user activity related to a room of a structure managed by the home automation system;
    maintaining a device of the home automation system that is associated with the room in a low-power state while there is no user activity related to the room, the device being an audio/video (A/V) device, a lighting device, a heating ventilation and cooling (HVAC) device, a security device or an interconnection device, the low-power state causing the device to duty cycle one or more hardware components of the device according to a first sleep interval;
    in response to detecting user activity related to the room, transitioning the device preemptively from the low-power state to a full-power state, the user activity being a user navigating to a screen for controlling the room in a control user interface (UI) displayed on a mobile device or remote control wherein the navigation to the screen occurs before use of the device, the full-power state causing the device to duty cycle the one or more hardware components of the device according to a second sleep interval, the second sleep interval having a length that is shorter than the first sleep interval; and
    in response to expiration of a timer since a) a last use of the device was made while the device was in the full-power state or b) the transition of the device to the full-power state was made and no actual use of the device occurred, and the user navigating away from the screen for controlling the room in the control UI to a different screen for controlling another room in the control UI, exiting the full-power state.

8. The method of claim 7, wherein the exiting further comprises:
    transitioning the device to an active state, the active state causing the device to duty cycle the one or more hardware components of the device according to a third sleep interval that has a length that is intermediate between the first sleep interval and the second sleep interval.

9. The method of claim 8, further comprising:
    in response to detecting no user activity related to the room, transitioning the device from the active state to the low-power state.

10. The method of claim 7, wherein the device is a battery-powered device.

11. A home automation system that provides power optimization, comprising:
    a battery-powered device of the home automation system having one or more hardware components and being associated with a room of a structure;
    a remote control or mobile device configured to display a control user interface (UI) of the home automation system; and
    a host controller of the home automation system that is coupled to and configured to control the battery-powered device and a plurality of other devices of the home automation system that are associated with the room, the plurality of other devices including one or more other audio/video (A/V) devices, lighting devices, heating ventilation and cooling (HVAC) devices, security devices or interconnection devices, the host controller including host software that when executed is operable to:

determine a user has navigated to a screen for controlling the room in the control UI, in response to at least the user navigating to the screen for controlling the room in the control UI, and before an attempt to use the battery-powered device by the user or another device of the home automation system in providing a second service in the room, signal the battery-powered device to transition preemptively from a low-power state in which the battery-powered device duty cycles the one or more hardware components according to a first sleep interval to a full-power state in which the battery-powered device duty cycles the one or more hardware components according to a second sleep interval, and in response to expiration of a timer since a) a last use of the battery-powered device was made while the device was in the full-power state or b) the transition of the device to the full-power state was made and no actual use of the device occurred, and user navigation away from the screen for controlling the room in the control UI to a different screen for controlling another room in the control UI, exit the full-power state.

12. The home automation system of claim 11, wherein the battery-powered device is further configured to:

when exiting the full-power state, transition to an active state in which the battery powered device duty cycles the one or more hardware components according to a third sleep interval that has a length intermediate between the first sleep interval and the second sleep interval.

13. The home automation system of claim 11, wherein the one or more hardware components include a Bluetooth low energy (BLE) adaptor of the battery-powered device.

* * * * *